April 7, 1964  S. C. HARRIS, JR., ETAL  3,128,070
POSITION INDICATING DEVICE

Filed May 31, 1960  2 Sheets-Sheet 1

INVENTORS:
SAMUEL C. HARRIS, JR.
LAWRENCE W. LANGLEY.

BY James G. Williams
THEIR ATTORNEY.

April 7, 1964 S. C. HARRIS, JR., ETAL 3,128,070
POSITION INDICATING DEVICE
Filed May 31, 1960 2 Sheets-Sheet 2
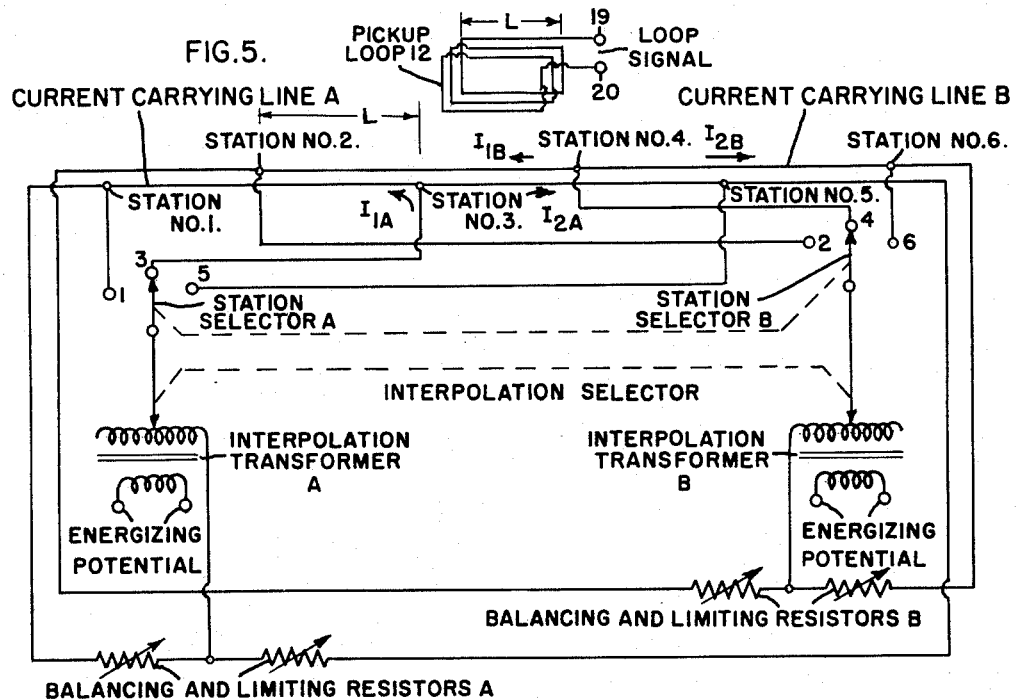
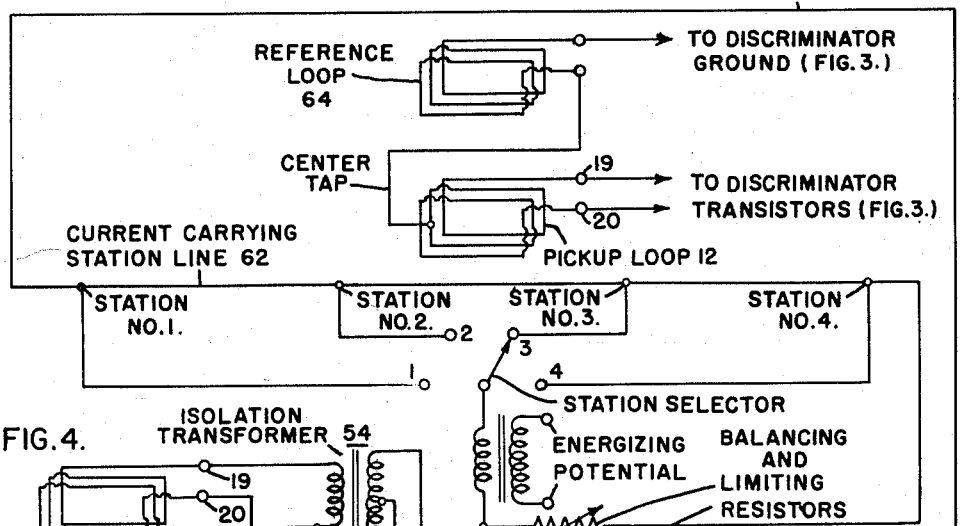
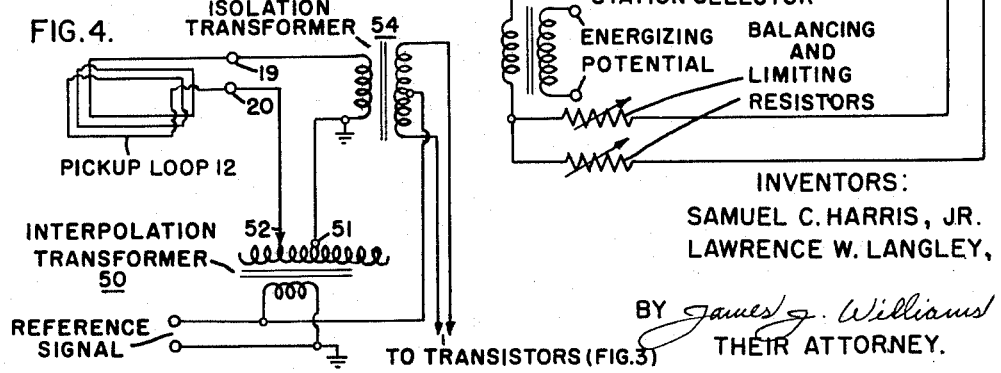
INVENTORS:
SAMUEL C. HARRIS, JR.
LAWRENCE W. LANGLEY,
BY James G. Williams
THEIR ATTORNEY.

United States Patent Office 3,128,070
Patented Apr. 7, 1964

3,128,070
POSITION INDICATING DEVICE
Samuel C. Harris, Jr., and Lawrence W. Langley, Waynesboro, Va., assignors to General Electric Company, a corporation of New York
Filed May 31, 1960, Ser. No. 32,700
14 Claims. (Cl. 246—122)

The invention relates to a position indicating device, and particularly to a device that indicates the position of two objects with respect to each other and that can be used with positioning systems to position two objects in a predetermined relationship.

Positioning systems which position one object with respect to a second object may utilize a drive device in the form of an electric or hydraulic motor in connection with position indicating and control devices to bring about the desired relative position. In such systems, a first signal having the characteristics indicative of the relative position of the two objects and indicative of the motion needed to bring about the desired relative position is generated by the position indicating device. This first signal is applied to the control device which converts this first signal into a second signal having the needed qualities and characteristics to run or control the drive device. As the drive device moves in response to the second signal, the two objects are also moved toward the desired relative position. As the two objects are so moved, the first signal approaches a characteristic and magnitude (usually zero) which indicates that less relative motion is required. At the time the desired relative position is reached, the first signal will have a magnitude and characteristic which calls for no further motion. Under this condition, the relative motion between the two objects is halted. The two objects will then retain their relative position until a new first signal is generated that calls for a new relative position.

Many of the available position indicating devices, such as differential transformer devices for examples, are limited in their applications. One reason that the devices are limited is because some mechanical connection, such as a gear train, is required between the position indicating device and the drive device to provide the necessary movement of the position indicating device as the drive device and one object are operated. In certain positioning systems, this mechanical connection may be impractical. In other systems, if the range of the positioning system is large, this mechanical connection may be difficult, if not practically impossible to provide.

Accordingly, an object of the invention is to provide a position indicating device that does not require any mechanical connection between the position indicating device and the drive device.

Another object of the invention is to provide a position indicating device that can be used with a positioning system with a range of positioning that may be either relatively large or relatively small.

Another object of the invention is to provide a device which can indicate relatively predetermined positions, and which can be provided with interpolating devices to indicate relative positions between the predetermined positions.

Another object of the invention is to provide a novel positioning indicating device that can be compatibly used with most positioning systems.

These and other objects of the invention are attained in accordance with the invention by an indicating device comprising current carrying means which are adapted to be positioned on one of two objects, and current sensitive means which are adapted to be positioned on the other of the two objects. In one embodiment of the invention, the current carrying means may take the form of an elongated wire positioned on the one object (usually the stationary object) along the path of relative motion of the two objects. The current carrying means are provided with means for enabling a current to flow between both ends and some selectable point between the ends, this selectable point being the location at which the second object (usually the movable object) is to be positioned relative to the first object. In accordance with the invention, the current sensitive means may take the form of a simple loop and are adapted to be positioned on the second object. The current sensitive means should be properly located with respect to the current carrying means so as to be sensitive to current flow therein. When properly located, the current sensitive means will produce a signal in response to the current in the carrying means. This signal has a characteristic and a magnitude which are indicative of the position of the current sensitive means with relation to the selectable point on the current carrying means. This signal can be utilized by positioning systems to provide the desired relative motion. With such motion being provided, as the second object carrying the current sensitive means approaches the desired location (which is at the selectable point between the ends of the current carrying means), the magnitude of the signal produced by the current sensitive means approaches a minimum. This signal becomes a minimum when the second object reaches the desired location. If the second object passes beyond the desired location, the signal produced will change its characteristic and will begin to increase in magnitude. Thus, the relative position of two objects can be indicated in accordance with the invention in a manner adaptable to many conditions and for many purposes.

The invention will be better understood from the following description taken in connection with the accompanying drawing, and its scope will be pointed out in the claims. In the drawing:

FIGURE 4 shows a portion of a circuit diagram of one embodiment of the invention that includes isolation and interpolation means;

FIGURE 5 shows a circuit diagram of another embodiment of the invention that includes interpolation means; and FIGURE 6 shows a schematic diagram of another embodiment of the invention that provides reference signals for the interpolation means without the use of mechanical or fixed electrical connections.

Figure 1:
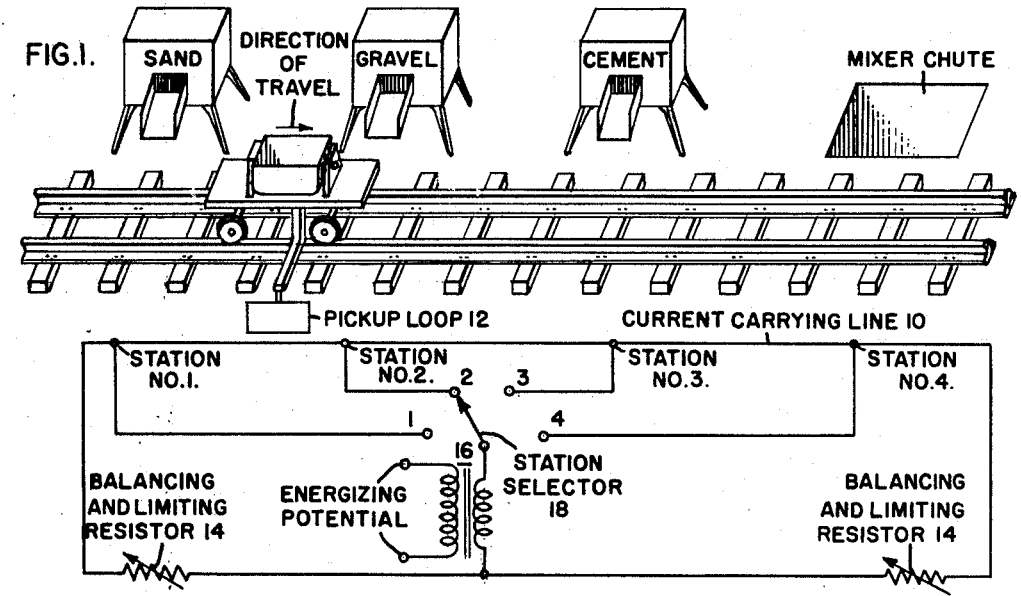
FIGURE 1 shows a circuit diagram of one embodiment of the invention as used in an illustrative application of the invention.

The illustrative application of the invention shown in FIGURE 1 comprises an arrangement for selectively hauling sand, gravel, and cement from storage bins (which may be randomly spaced) by means of a dump car which moves along a track. In the illustrative application, the dump car may move to any one of the storage bins and receive sand, gravel, and cement, and then move to a mixer chute where the dump car dumps these materials. The materials might then be mixed, as in the case of a plant which produces concrete. The dump car may be positioned at any of the bins or chute by a positioning system which controls the movement of the dump car. Such a system might include drive means such as an electric motor (not shown) which could be mounted on the dump car and which is controlled by a signal from a control device. The control device would receive signals from the position indicating device of the invention. In accordance with the invention, an elongated current carrying line 10 of unwound or uncoiled form is positioned alongside or in the vicinity of the track, the current carrying line 10 being positioned so that a pickup loop 12 carried by the dump car retains a substantially constant orientation and spacing with respect to the current carrying line 10. The two ends of the current carrying line 10 are respectively coupled through adjustable balancing and limiting resistors 14 to one side of a source of energizing potential which is preferably but not necessarily alternating current. As shown in FIGURE 1, the source of energizing potential may include a transformer 16 which has its primary winding coupled to a source of energizing potential having a frequency which is preferably but not necessarily higher than 1,000 cycles. For example, a frequency of 5,000 cycles is one preferred frequency. Relatively low frequencies may receive interference from the strong power frequencies usually present. The secondary winding of the transformer 16 is coupled between the mechanically movable switch arm of a station selector 18 and the junction of the two balancing and limiting resistors 14. As shown in FIGURE 1, the mechanically movable switch arm of the station selector 18 may be rotated to engage one of a plurality of contacts. Four contacts are provided in the arrangement of FIGURE 1 inasmuch as the illustrative application comprises four stations or positions for the dump car. The four contacts are coupled to the current carrying line 10 at the respective stations. The exact locations at which the contacts are coupled to the line 10 are determined by the position of the pickup loop 12 when the dump car is properly positioned in front of the storage bins and mixer chute. Thus in FIGURE 1 the locations of the points of coupling of the contacts are such that the pickup loop 12 is centered with respect to each of the points of coupling when the dump car is properly positioned with respect to the storage bins or the mixer chute. As will be explained, signals induced in the pickup loop 12 by current flow in the current carrying line 10 indicate the position of the pickup loop 12 relative to a selected one of the four stations and can be used with a positioning system to position the dump car (or other object) at that selected station.

Figure 2:
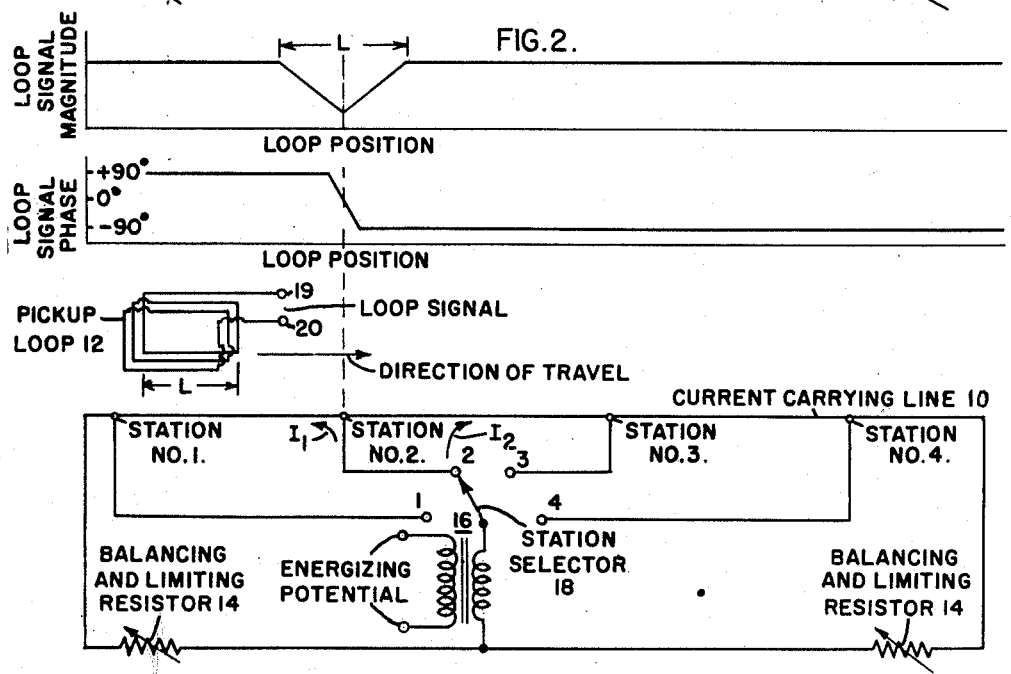
FIGURE 2 shows waveforms with relation to one embodiment of the invention for illustrating the operation of the invention.

FIGURE 2 shows an enlarged view of the pickup loop 12, and the details of its orientation with respect to the current carrying line 10 of the position indicating device. FIGURE 2 also shows waveforms which illustrate the operation of the position indicating device. With the movable switch arm of the station selector 18 engaging contact number 2, an electrical circuit is provided from the top end of the secondary winding of the transformer 16 through the movable switch arm of the selector 18, contact number 2, both sections of the current carrying line 10, and the balancing and limiting resistors 14 back to the bottom end of the secondary winding. The pickup loop 12 may take any of a number of forms, it being contemplated that the loop is of substantially rectangular shape and comprising, as an example, 100 turns. The turns of the pickup loop 12 are terminated at output terminals 19, 20. It is preferable that the pickup loop 12 and the current carrying line 10 lie in a common plane so that as strong a signal as possible be produced by the pickup loop 12. With a suitable alternating current potential applied to the primary winding of the transformer 16, the induced voltage across the secondary winding of the transformer 16 causes current to flow along or through this electrical circuit. If the potential is an alternating current, as represented in FIGURE 2, then at some given instant this current is in the direction indicated by the two arrows. The arrows are arbitrarily designated $I_1$ for current which is in the left section of the line 10 and $I_2$ for current which is in the right section of the line 10. Each of the currents $I_1$ and $I_2$ induces an individual signal or voltage in the pickup loop 12. The two individual signals produced by the two currents $I_1$ and $I_2$ in the pickup loop 12 appear at the output terminals 19, 20 as a single resultant signal which is the vector sum of the two individual signals. This vector sum is less than either of two individual signals because the current $I_1$ and $I_2$ are in opposite directions with respect to the pickup loop 12. If the pickup loop 12 is located to the left of station number 2 as shown, the current $I_1$ in the left section produces a signal in the pickup loop 12 which is predominant with respect to the signal produced by the current $I_2$ in the right section. However, as the pickup loop 12 approaches or gets nearer to station number 2, the current $I_2$ has more effect on the resultant signal produced by the pickup loop 12. When the pickup loop 12 is centered with respect to station number 2, the effects of the two currents $I_1$ and $I_2$ are very nearly equal, but since they produce opposite effects, the resultant signal is a null or low value. The resultant signal produced by the pickup loop 12 in response to the currents $I_1$ and $I_2$ has a magnitude and characteristic indicated by the two waveforms shown in FIGURE 2. The waveforms shown in FIGURE 2 are positioned to show the magnitude and characteristic of the loop signals for positions of the pickup loop 12 along the current carrying line 10 when station number 2 is selected. The position of the waveforms of FIGURE 2 applies only for the movable arm of the station selector 18 engaging contact number 2. For a different position of the movable arm, the waveforms would be positioned appropriately with respect to the station selected. When the pickup loop 12 is displaced a relatively large distance on either side of a selected station, the resultant signal magnitude is a maximum. However, as the pickup loop 12 approaches the selected station, the resultant signal produced by the pickup loop 12 decreases in magnitude and reaches a minimum when the pickup loop 12 is centered with respect to the selected station. If the pickup loop passes through or beyond the selected station, the resultant signal magnitude again increases. As shown in FIGURE 2, the magnitude of the loop signal reaches a maximum for all practical purposes at a distance substantially equal to half of the loop length L on each side of the selected station. The characteristic of the resultant signal produced by the pickup loop 12 also changes as the pickup loop 12 approaches and passes beyond a selected station. With reference to FIG. 2, which contemplates an alternating current energizing potential and hence an alternating current in the current carrying line 10, the characteristic of the resultant signal is a phase characteristic. However, if this energizing potential were unidirectional or direct current (and if the direct current in the current carrying line 10 were sensed by some means), then the characteristic of the resultant signal would be a polariy characteristic. Thus, in terms of an alternating current energizing potential, as the pickup loop 12 moves from the left towards the selected station number 2 to the right, its signal has a phase characteristic which changes by 180°. This is illustrated by the waveform in FIGURE 2 which shows the phase characteristic of the loop signal having a value of +90 degrees when the pickup loop 12 is to the left of station number 2, having a value of zero degrees when the pickup loop 12 is centered at station number 2, and having a value of −90 degrees when the pickup loop 12 is to the right of station number 2. A signal such as the one described which has a magnitude and phase characteristic indicative of the relative location of two objects may be used with positioning systems to effect positioning of the two objects as will be explained subsequently.

Figure 3:
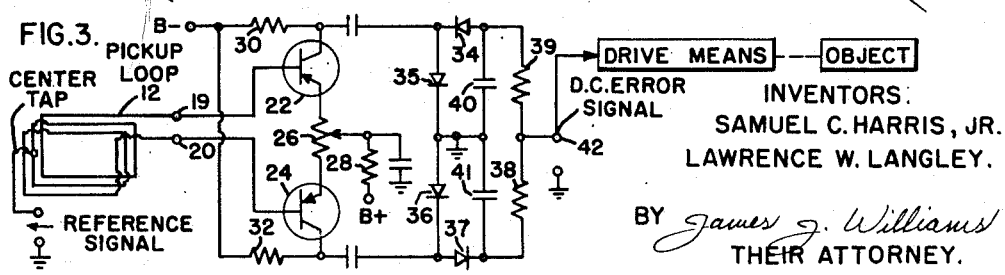
FIGURE 3 shows one example of a discriminator circuit that produces signals for use with a control device in response to signals from current sensitive means.

Many, if not all, positioning systems operate on a control signal which is a direct current signal. Thus, relative positioning in one direction might be indicated by a positive direct current signal and relative positioning in the opposite direction might be indicated by a negative direct current signal. FIGURE 3 shows one example of a phase discriminator circuit which may be used in a positioning system to convert the resultant signal produced by the pickup loop 12 into a direct current signal for use with a positioning system and drive device to effect positioning. In order that a direct current signal of correct polarity may be produced by the discriminator, it is necessary that the phase of a reference signal of the same frequency as the resultant signal produced by the pickup loop 12 be compared with the phase of the resultant signal produced by the pickup loop 12. This reference signal may be applied to the pickup loop 12 at its center tap as shown. But wherever the reference signal is applied, it should have the same frequency as the resultant signal produced by the pickup loop 12. With reference to the phase discriminator circuit, the terminals 19, 20 of the pickup loop 12 are coupled to the respective base electrodes of two PNP transistors 22, 24. The emitter electrodes of the transistors 22, 24 are coupled to the ends of a balancing resistor 26, this balancing resistor 26 having a movable tap which is coupled to a suitable source of unidirectional potential which is positive with respect to a point of reference potential and which is designated by the legend B+. It has been assumed that the point of reference potential in the circuit of FIGURE 3 is connected to ground as shown. However, it is not necessary that the point of reference potential be so grounded. If desired, a voltage dropping resistor 28 may be connected between the movable tap of the balancing resistor 26 and the source of energizing potential B+. The collector electrodes of the transistors 22, 24 are respectively coupled through resistors 30, 32 to a suitable source of unidirectional potential which is negative with respect to the point of reference potential and which is designated by the legend B—. The collector electrodes of the transistors 22, 24 are also capacitively coupled to a network comprising four rectifier elements or diodes 34, 35, 36, 37 which form a negative detector for signals from the transistor 22 and a positive detector for the signals from the transistor 24. Two equal resistors 38, 39 provide a voltage divider for the detector outputs. The direct current voltage at the junction 42 of the resistors 38, 39 will be proportional to the difference in amplitudes of the signals from the transistors 22, 24. The outputs of the detector may be shunted by capacitors 40, 41 for the purpose of smoothing the rectified signals. The output signal of the discriminator is derived at the junction 42 of the two resistors 38, 39 with respect to the point of reference potential.

With a reference signal being applied to the center tap of the pickup loop 12, and with the pickup loop 12 positioned to respond to currents in the current carrying line 10 of FIGURE 2, if the pickup loop 12 is positioned so that one current, say $I_1$ for example, in the current carrying line 10 is predominant in the pickup loop 12, then the signal induced by that one current $I_1$ aids the reference signal in one half of the pickup loop 12 and opposes the reference signal in the other half of the pickup loop 12. If the reference signal in the respective halves of the pickup loop 12 is equal in magnitude to the induced signals in the respective halves of the loop 12, then a large signal appears at one terminal, say the terminal 19, of the loop 12 and substantially no signal appears at the other terminal 20 of the loop 12. During positive-going swings of the signal at the terminal 19, the transistor 22 is blocked so that a negative direct current signal appears at the output terminal 42. The transistor 24 remains blocked at all times under these conditions, but the diode 37 presents an open circuit in this part of the circuit. If the pickup loop 12 is located so that the current $I_2$ is predominant, a large signal appears at the terminal 20. During negative-going swings of this signal at the terminal 20, the transistor 24 conducts so that a positive direct current signal appears at the output terminal 42. If the pickup loop 12 is centered at the selected station, then the induced signals respectively aid or oppose the reference signal in the two halves of the pickup loop 12. If the signals aid, then signals of equal magnitude are applied to the base electrodes of both of the transistors 22, 24. Under this condition, no net direct current signal is produced at the output terminal 42 of the discriminator because both transistors 22, 24 alternately conduct in equal amounts so that the junction of the output resistors 38, 39 remains at the reference potential. The same condition prevails if, when the pickup loop 12 is centered at the selected station, the induced and reference signals in each half of the pickup loop 12 oppose each other so that no net direct current signal appears at the output terminal 42. The direct current signal can be used as an error signal, which, after suitable amplification, can be used to control a drive device. A positive error signal can be used to cause the drive device to operate in one direction, a negative error signal can be used to cause the drive device to operate in the opposite direction, and no error signal can be used to stop operation of the drive device. Thus, the position indicating device of the invention can be used with a positioning system to control the relative motion of two objects. In the example assumed in FIGURE 1, this drive device could control the movement of the dump car which could carry a self-contained power supply, a positioning system including a source of reference signals, and a drive device. A positioning system exemplifying the system just described, but using a selsyn for position indications, is shown in Patent No. 2,537,770 granted to O. W. Livingston, et al. on January 9, 1951. After movement of the dump car to one station has been accomplished, the movable arm of the station selector 18 can be manually or automatically moved to another position which couples the source of energizing potential to a tap corresponding to another station. This results in an unbalanced signal in the pickup loop 12 with the result that a new direct current error signal is produced by a discriminator such as shown in FIGURE 3. Thus, movement of the dump car is called for again, and will continue to be called for until the pickup loop 12 is symmetrically positioned with respect to the selected station.

FIGURE 4 shows a circuit diagram of two features which can be used with the invention to provide isolation of the pickup loop 12 from the discriminator of FIGURE 3 and to provide interpolation signals to effect positioning between selected stations. The interpolation signals are provided by an interpolation transformer 50 which has its primary winding coupled to a suitable energizing source such as the source of reference signals. The secondary winding of the interpolation transformer 50 is provided with a fixed center tap 51 and a movable tap 52 which enable a predetermined magnitude and phase of voltage to be derived from the secondary winding of the interpolation transformer 50. The two taps 51, 52 of the secondary winding of the interpolation transformer 50 are coupled in series with the pickup loop 12 and with the primary winding of an isolation transformer 54. The isolation transformer 54 is provided to permit insertion of the interpolation transformer without unbalancing the output of the pickup loop 12 with respect to its center tap, and to permit use of a loop without a center tap. The source of reference signals is coupled to the center tap of the secondary winding of the interpolation transformer 54. Thus, the pickup loop 12 has two transformer windings coupled in series with it. It will be seen that the resultant signal produced by the pickup loop 12 may be modified by a signal having a phase and magnitude determined by the location of the movable tap 52 on the secondary winding of the interpolation transformer 50 so as, in effect, to induce an artificial signal into the pickup loop 12 output. Thus, if it is desired that the pickup loop 12 and the associated object be moved to a position to one side of a selected station, the movable tap 52 on the secondary winding of the interpolation transformer 50 may be moved to a point which introduces a signal into the pickup loop output circuit which, when combined with the resultant signal produced by the pickup loop 12, produces a signal that calls for no further motion when the pickup loop 12 is at this desired point displaced from the selected station. A position at some point on the other side of the selected station may be obtained if the moavble tap 52 on the secondary winding of the interpolation transformer 50 is moved to a point on the other side of the fixed tap 51 of this secondary winding. The center tap of the secondary winding of the interpolation transformer 50 may be connected to the point of reference potential as shown.

The interpolation transformer 50 is thus capable of adding a series voltage of either phase and any magnitude to the output signal of the pickup loop 12 by an appropriate location of the movable tap 52 on the secondary winding of the interpolation transformer 50. This adjustment may be made either in smooth or step fashion. The combined signals are applied to the isolation transformer 54 and, in turn, to the phase discriminator transistors 22, 24 of FIGURE 3. The discriminator of FIGURE 3 converts these signals into a direct current error signal which can be used to effect the desired motion. The arrangement shown in FIGURE 4 takes advantage of the fact that the phase and magnitude of the resultant output signal of the pickup loop 12 vary in a predictable manner with respect to its displacement from the null position as shown by the waveforms of FIGURE 2. However, such linear variations are not essential to the operation of the arrangement of FIGURE 4.

FIGURE 5 shows a circuit diagram in accordance with the invention for providing signals for positions of the pickup loop 12 between selected stations by the use of two current carrying lines A and B. The current carrying lines A and B are preferably positioned as close together as possible so that the pickup loop 12 maintains a constant orientation with respect to both current carrying lines A and B. In the arrangement shown in FIGURE 5, current carrying line A is provided with selectable stations 1, 3, and 5 and an appropriate station selector A. Likewise, current carrying line B is provided with selectable stations 2, 4, and 6 and a station selector B. The selectable stations are alternately located at preferably equal spacings with respect to motion of the pickup loop 12 so that as the pickup loop moves along the current carrying lines A and B, it alternately passes a selectable station of one line and then the other line. As shown in FIGURE 5, it is desirable but not necessary that the pickup loop 12 have a length L substantially equal to the distance between adjacent selectable stations. The movable arms of the respective station selectors A and B are preferably mechanically coupled together so that as they are moved they connect to adjacent stations of the two lines A and B at the same time for all of their positions. Each movable arm is respectively coupled to a movable tap on a respective secondary winding of the interpolation transformers A and B. The primary windings of the interpolation transformers A and B are suitably energized by an alternating current signal having, for example, a frequency of 5,000 cycles. One end of each of the secondary windings of the interpolation transformers A and B is coupled to the junction of respective balancing and limiting resistors A and B which, in turn, are respectively coupled to the ends of the current carrying lines A and B.

In the operation of the arrangement shown in FIGURE 5, the movable arms of the station selectors A and B are first positioned to engage the contacts associated with the stations which bridge the desired intermediate position of the pickup loop 12. In FIGURE 5 it has been assumed that the desired position of the object and hence the pickup loop 12 is centered between stations 3 and 4. Accordingly, the movable arms of the station selectors A and B are connected to taps corresponding to stations 3 and 4. Since a center position between stations 3 and 4 is desired, the movable taps of the interpolation transformers A and B are centered between the ends of the secondary windings A and B so that equal magnitudes of signals are applied to the movable arms of the station selectors A and B. If the pickup loop 12 is displaced from its desired position, as for example in the vicinity of station 2, currents $I_{1A}$ and $I_{1B}$ induce signals in the pickup loop 12 which indicate that the pickup loop 12 is to the left of the desired location. As the pickup loop 12 moves to the right past station 3, the currents $I_{1A}$ and $I_{2A}$ produce equal and opposite effects in the pickup loop 12. However, the current $I_{1B}$ still produces an effect in the pickup loop 12 that indicates that the pickup loop 12 is to the left of the desired location. When the pickup loop 12 is centered between stations 3 and 4, the predominant currents affecting the pickup loop 12 are $I_{2A}$ and $I_{1B}$, and if the arrangement is properly adjusted, these currents have equal and opposite effects. Hence, the pickup loop 12 produces a signal which is a minimum, and thus calls for no further movement. If a position of the pickup loop 12 at some point other than the mid-point between two stations is desired, the movable taps of the interpolation selector may be adjusted accordingly, the greater signal of the movable taps resulting in a predominant effect from its respective current carrying line A or B. With respect to FIGURE 5, it is desirable that the pickup loop 12 have a length L substantially equal to the spacing of adjacent stations because the equal and opposite currents such as $I_{1B}$ and $I_{2A}$ in the example may otherwise produce a broadening of the null in the vicinity of the midpoint. If positioning at precisely one station is desired, for example station 3, the station selectors A and B are positioned so that the appropriate movable arm is at the desired station, and the interpolation selector is moved so that a maximum signal is applied to that movable arm selecting the desired station and so that a minimum signal, preferably zero, is applied to the other movable arm. Thus, if positioning at station 3 is desired, station selector B has substantially no signal or a minimum signal applied to it, while station selector A which is coupled to the tap associated with station 3 has a maximum amplitude signal applied to it. The arrangement then acts as in a manner similar to that shown in FIGURE 2 where only one current carrying line is provided.

In certain applications, it may be physically difficult or undesirable to provide a reference signal for the pickup loop through conventional means. In such cases, as shown in FIGURE 6, a current carrying reference line 60 may be provided in addition to a current carrying station line 62. Both lines 60, 62 may be supplied from a single source of energizing potential. The reference line 60 may also be used, as shown, to provide one side of the circuit to the station line 62. A reference or reference signal loop 64 is required, and serves to pick up a reference signal from the current carrying reference line 60 and apply this reference signal to the center tap of the pickup loop 12. Otherwise, the operation of the arrangement shown in FIGURE 6 is substantially the same as that shown in the other figures.

The balancing and limiting resistors shown in the various figures are provided for two reasons. One reason is so that the impedances of the current carrying line on both sides of its center may be made as nearly equal as possible. This is desirable so that substantially equal currents are provided in both sides of the current carrying line. The other reason is so that the currents in the current carrying line may be limited to a reasonable and desirable value in connection with the magnitude of the energizing potential. With all other factors being equal, it is desirable that the impedance of the balancing and limiting resistors be rather large with respect to the impedance of the current carrying line, for example, a ratio of 1000 to one. Such a large ratio lessens the effect of a slight current unbalance which results when the station selector selects a station near either end of the current carrying line. This unbalanced condition would otherwise place substantially all of the impedance of the current carrying line in one of the two current paths.

While the station selectors and interpolation selectors have been shown as mechanical arrangements, it is to be understood that the invention contemplates the use of other arrangements such as saturable transformers or solid state devices. However, in the invention has been shown utilizing mechanical selectors in the interest of clarity. In addition, it is to be understood that sliding contacts may be used in place of the fixed taps.

While the invention has been shown in one embodiment which contemplates a relatively large range of positioning, in the order of a 100 feet or more, it is to be understood that the invention may be applied equally well to arrangements which positon over a range in the order of less than 100 inches. The invention is in no way limited to any range, and may be used in any installation where the pickup loop is able to provide signals indicative of the selected station. The position indicating device of the invention requires no mechanical connection to the drive device, hence eliminates the problems of connection and friction regardless of the range of operation. It may also be used in systems which provide positioning in the three dimensions and in directions other than along straight lines. And, as described, various means may be provided for interpolating so that the loop may be positioned at selectable points between adjacent stations. Where the range of positioning is small, in the order of inches, the current carrying line and taps may be made on a printed circuit board. In a given positioning system, a number of such boards could be utilized, each board having a different configuration and/or spacing of the taps along the current carrying line. The desired board could either be plugged into a receptacle or selected by switching means. Persons skilled in the art will appreciate many other modifications and arrangements which can be made and which still come within the spirit and scope of the invention. Thus, while the invention has been described with reference to particular embodiments, it is to be understood that modifications may be made without departing from the spirit of the invention or from the scope of the claims.

What we claim as new and desire to secure by Letters Patent of the United States is:

1. A device for indicating the position of two objects with relation to each other comprising current carrying means adapted to be associated with one of said objects, said current carrying means being unwound and having a common current path which branches into two main current paths, and current sensitive means adapted to be associated with the other of said objects, said current sensitive means being arranged to produce a signal in response to the current through said two main current paths of said current carrying means.

2. A device for indicating the position of two objects with relation to each other comprising an elongated and unwound current carrying arrangement adapted to be fastened to one of said objects, said current carrying arrangement having at least one common current path intermediate the ends thereof for providing a current path to and from said ends, and current sensitive means adapted to be fastened to the other of said objects, said current sensitive means being arranged to produce a signal in response to current in said current carrying arrangement, said signal having a magnitude and characteristic indicative of the relative position of said common current path and said current sensitive means.

3. A device for indicating the relative position of two objects comprising an elongated and unwound current carrying line adapted to be fastened to one of said objects, said current carrying line having a plurality of paths coupled thereto intermediate the ends thereof, first means for selecting one of said paths and causing a current flow between said one selected path and said ends of said current carrying line, and second means adapted to be fastened to the other of said objects, said second means being arranged to produce a signal in response to said current in said current carrying line, said signal having a magnitude and characteristic indicative of the relative position of said one selected path and said second means.

4. A device for indicating the relative position of two objects comprising an elongated and unwound current conducting line adapted to be positioned on one of said objects in the vicinity of the path of relative motion of said objects, said current conducting line having a plurality of taps coupled thereto at points intermediate the ends of said current conducting line, first means coupled to said ends of said current conducting line to enable a current to flow between a selected one of said taps and both of said ends of said current conducting line, and current sensitive means adapted to be fastened to the other of said objects, said current sensitive means being arranged to produce a signal in response to current in said current conducting line, said signal having a characteristic indicative of the location of said current sensitive means with respect to said selected tap and said ends of said current conducting line and having a magnitude indicative of the distance between said current sensitive means and said selected tap.

5. A device for indicating the relative position of two objects comprising an elongated and unwound current conducting line adapted to be positioned on one of said objects in the vicinity of the path of relative motion of said two objects, means coupled to said current conducting line intermediate the ends thereof for enabling currents to flow along said current conducting line between a selectable point and said ends of said current conducting line, and a current sensitive loop adapted to be positioned on the other of said objects, said loop being oriented with respect to said current conducting line for producing a signal in response to current in said current conducting line, said signal having a phase indicative of the location of said loop with respect to said selectable point and said ends of said current conducting line and having a magnitude indicative of the proximity of said loop to said selectable point.

6. A device for indicating the relative position of two objects comprising an unwound current carrying line adapted to be fastened to one of said objects, first means for coupling a tap to said current carrying line at a selectable point between the ends of said current carrying line to form an electrical circuit between said tap and said ends, second means coupled to said tap and to said ends of said current carrying line for supplying an energizing potential thereto and causing a current flow in said electrical circuit, and a current sensitive loop adapted to be positioned on the other of said objects, said loop being oriented with respect to said current carrying line for producing a signal in response to current in said electrical circuit, said signal having one phase when said loop is positioned between said tap and one end of said current carrying line, said signal having a second phase when said loop is positioned between said tap and the other end of said current carrying line, and said signal having a magnitude dependent upon the distance between said loop and said tap.

7. A device for indicating the relative position of two objects comprising an unwound current carrying line adapted to be fastened to one of said objects, said current carrying line having a plurality of taps coupled thereto intermediate the ends thereof, first means for selecting one of said taps to form an electrical circuit between said first means and said ends, second means coupled to said first means and to said ends of said current carrying line for supplying an energizing potential thereto and causing a current flow between said selected tap and said ends, and a current-sensitive loop adapted to be positioned on the other of said objects, said loop being oriented with respect to said current carrying line for producing a signal in response to current in said electrical circuit, said signal having one phase when said loop is positioned between said selected tap and one end of said current carrying line, said signal having a second phase when said loop is positioned between said selected tap and the other end of said current carrying line, and said signal having a magnitude dependent upon the distance between said loop and said selected tap.

8. The device as defined in claim 6, and having in addition interpolating means associated with said loop for supplying an interpolating signal thereto.

9. The device as defined in claim 6, and having in addition an interpolating transformer, said interpolating transformer including a primary winding and a secondary winding, means coupled to said secondary winding for deriving a predetermined voltage therefrom, and means coupling said last-named means to said loop for supplying an interpolating signal in circuit therewith.

10. A device for indicating the relative position of two objects comprising a first unwound current carrying line adapted to be fastened to one of said objects, means for coupling a first tap to said first current carrying line at a selectable point between the ends of said first current carrying line to form a first electrical circuit between said first tap and said ends, means coupled to said first tap and to said ends of said first current carrying line for supplying an energizing potential thereto and causing a current flow in said first electrical circuit, a second unwound current carrying line adapted to be fastened to said one object, means for coupling a second tap to said second current carrying line at a selectable point between the ends of said second current carrying line to form a second electrical circuit between said second tap and said ends of said second current carrying line, means coupled to said second tap and to said ends of said second current carrying line for supplying an energizing potential thereto and causing a current flow in said second electrical circuit, said first and said second current carrying lines being positioned relatively close to but insulated from one another, a current sensitive loop adapted to be positioned on the other of said objects, said loop being oriented with respect to both of said current carrying lines for producing a signal in response to current in both of said electrical circuits, said signal having a phase indicative of the location of said loop with respect to said first and second taps and with respect to said ends of said first and second current carrying lines and having a magnitude indicative of the distance between said loop and a selectable position intermediate said first and second taps.

11. The device as defined in claim 10, and having in addition interpolating means coupled to both of said energizing potential means for supplying interpolating signals thereto.

12. A system for producing relative motion between two objects comprising an elongated and unwound current carrying line adapted to be fastened to one of said objects, said one object being arranged to be stationary, a tap, first means for coupling said tap to said current carrying line at a selectable point between the ends of said current carrying line to form an electrical circuit between said tap and said ends, second means coupled to said tap and to said ends of said current carrying line for supplying an energizing potential thereto and causing a current flow in said electrical circuit, a current sensitive loop adapted to be positioned on the other of said objects, said other object being arranged for motion, said loop being oriented with respect to said current carrying line for producing a signal in response to the current in said electrical circuit, said signal having one phase when said loop is positioned between said tap and one end of said current carrying line, said signal having a second phase when said loop is positioned between said tap and the other end of said current carrying line, and said signal having a magnitude dependent upon the distance between said loop and said tap, a discriminator circuit coupled to said loop for producing a control signal having a polarity indicative of the phase of said signal produced by said loop, drive means coupled to said other object for providing motion of said other object, and means coupling said discriminator circuit to said drive means for controlling the operation of said drive means in response to said control signal.

13. The device as defined in claim 6, and having in addition an unwound current carrying reference line adapted to be fastened to said one object, means for supplying an energizing potential to said reference line, and a current sensitive reference loop adapted to be positioned on said other object, said reference loop being oriented with respect to said reference line for deriving a reference signal therefrom.

14. The device as defined in claim 10, and having in addition a current sensitive reference loop adapted to be positoned on said other object, said reference loop being oriented with respect to one of said lines for producing a reference signal for application to said current sensitive loop.

References Cited in the file of this patent

UNITED STATES PATENTS

| | | |
|---|---|---|
| 1,475,749 | Chubb | Nov. 27, 1923 |
| 2,558,445 | Laurenson | June 26, 1951 |
| 2,618,770 | Schwarz | Nov. 18, 1952 |
| 2,782,348 | Luhn | Feb. 19, 1957 |
| 2,962,652 | Bulliet et al. | Nov. 29, 1960 |